US005174538A

United States Patent [19]

Okada

[11] Patent Number: 5,174,538

[45] Date of Patent: Dec. 29, 1992

[54] ROTARY SUPPORT DEVICE

[75] Inventor: Minoru Okada, Suita, Japan

[73] Assignee: Osaka Taiyu Co., Ltd., Osaka, Japan

[21] Appl. No.: 591,477

[22] Filed: Oct. 1, 1990

Related U.S. Application Data

[63] Continuation of Ser. No. 344,817, Apr. 27, 1989, abandoned.

[30] Foreign Application Priority Data

Apr. 28, 1988 [JP] Japan ............................... 63-107930

[51] Int. Cl.[5] ............................................. A47B 91/00

[52] U.S. Cl. ..................................... 248/349; 384/615

[58] Field of Search ............... 248/415, 349, 664, 131, 248/425, 919, 920, 922; 108/139, 142, 94, 103; 384/526, 523, 485, 477

[56] References Cited

U.S. PATENT DOCUMENTS 757,824 4/1904 Martin ................................ 384/609
3,860,301 1/1975 Zerbola .
4,027,932 6/1977 Kunkel .
4,111,501 9/1978 Johnston ............................ 384/526
4,505,524 3/1985 Krall .................................. 384/615
4,566,812 1/1986 Takei .................................. 384/615
4,696,588 9/1987 Tanaka ............................... 384/615
4,699,527 10/1987 Hutzel .
4,708,497 11/1987 Lederman .......................... 384/615
4,822,183 4/1989 Lederman .......................... 384/523

FOREIGN PATENT DOCUMENTS 2057187 11/1970 Fed. Rep. of Germany .
2156081 11/1971 Fed. Rep. of Germany .
496182 9/1970 Switzerland .
447966 5/1936 United Kingdom .

*Primary Examiner*—J. Franklin Foss

*Attorney, Agent, or Firm*—Armstrong, Nikaido, Marmelstein, Kubovcik & Murray

[57] ABSTRACT

A rotary support device comprising an under ring including a horizontal portion and a peripheral wall, the wall projecting upward from the inner periphery of the horizontal portion and being inclined either outward or inward, the wall being formed with a guide groove in a peripheral surface thereof, and an upper ring including a horizontal portion and a peripheral wall, the upper ring wall projecting downward from the inner periphery of the horizontal portion and being inclined along the inclined under ring wall, the upper ring wall being formed with a guide groove in a peripheral surface thereof. The two rings are fitted to each other with a row of balls rollably fitted in their respective guide grooves. The grooved wall portion of each ring has a side edge partially covering the balls from above or below in engagement therewith. The two rings are engaged with each other inseparably and rotatably by the balls. The device is assembled by placing a multiplicity of balls in an annular arrangement into the guide groove of one of the under and upper rings, arranging the two rings as opposed to each other concentrically with the balls interposed therebetween and prevented from falling off as by grease, and pressing the rings against each other to elastically deform the ring walls and thereby fit the balls into the guide grooves of the rings.

4 Claims, 4 Drawing Sheets

ROTARY SUPPORT DEVICE

This is a continuation of application Ser. No. 07/344,817 filed Apr. 27, 1989 now abandoned.

FIELD OF THE INVENTION

The present invention relates to rotary support devices for use in performing work for articles while rotating the article.

BACKGROUND OF THE INVENTION

FIG. 8 shows a rotary support device which is conventionally used and in which balls 4 are arranged in a row between the peripheral wall 13 of an under ring 1 and the peripheral wall 23 of an upper ring 3.

When an article (not shown) is placed on a pallet 8 as placed on the device, the article can be lightly rotated along with the pallet, hence convenience.

However, the conventional rotary support device has the problem that it is low in durability against thrust loads despite its high durability against radial loads. This problem is attributable to the following construction. As will be apparent from FIG. 8, the peripheral walls 13, 23 of the under ring 1 and the upper ring 2 are approximately perpendicular to the plane of rotation of the support device, so that the area of contact of the balls 4 in guide grooves 15, 25 formed in the opposed surfaces of the walls 13, 23 with the grooved portions 15, 25 is much smaller in the thrust direction than in the radial direction.

Furthermore, the support device is assembled by fitting the upper ring 2 to the under ring 1, then placing the balls 4 into the space between the ring walls 13, 23 through a hole 14 formed in the inner ring, and thereafter closing the hole 14.

Further, the support device failed to provide between the rings with any retainer for holding balls.

SUMMARY OF THE INVENTION

An object of the present invention is to provide a rotary support device simplified in construction and in assembling procedure and rotatable with good stability, and a method of producing the device.

Another object of the invention is to provide a rotary support device having sufficient durability against thrust loads as well as against radial loads, and a method of producing the device.

The rotary support device of the present invention comprises an under ring including a horizontal portion and a peripheral wall projecting upward from the inner periphery of the horizontal portion and inclined either outward or inward, the wall being formed with a guide groove in a peripheral surface thereof, and an upper ring including a horizontal portion and a peripheral of the horizontal portion and inclined along the inclined under ring wall, the upper ring wall being formed with a guide groove in a peripheral surface thereof. A multiplicity of balls are rollably fitted in the guide grooves and interposed between the two rings. The under ring wall and the upper ring wall are engaged with each other rotatably and inseparably by the balls.

With the rotary support device of the invention, the under ring peripheral wall and the upper ring peripheral wall rollably supporting the balls are inclined with respect to the axis of rotation, and the balls are adapted to withstand both radial load and thrust load at the same time. The device therefore has sufficient durability and is simple in construction.

Since the balls are rollable as fitted in the guide grooves of the under and upper rings, the two rings are free of misalignment, rendering the device useful for precision work.

The invention further provides a method of producing the rotary support device which comprises the steps of placing the multiplicity of balls in an annular arrangement into the guide groove of either one of the under and upper rings, arranging the two rings as opposed to each other concentrically, with the balls interposed therebetween and prevented from falling off by holding means, and pressing the rings against each other to elastically deform the ring walls and thereby fit the balls into the guide grooves of the rings.

DETAILED DESCRIPTION OF EMBODIMENTS

The present invention will be described below in greater detail with reference to the illustrated embodiments.

Although a method will be described below of producing large rotary support devices for use with an article handling pallet, small devices can of course be produced similarly, for example, for use in drawing pictures on clay jaws or pots or in trimming or taking care of potted plants.

Figure 1:
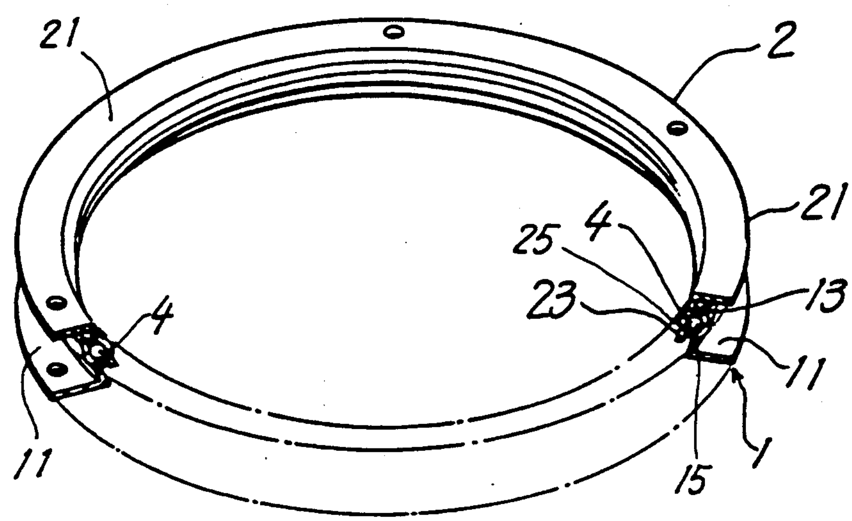
FIG. 1 is a perspective view partly broken away and showing a rotary support device embodying the invention.
Figure 2:
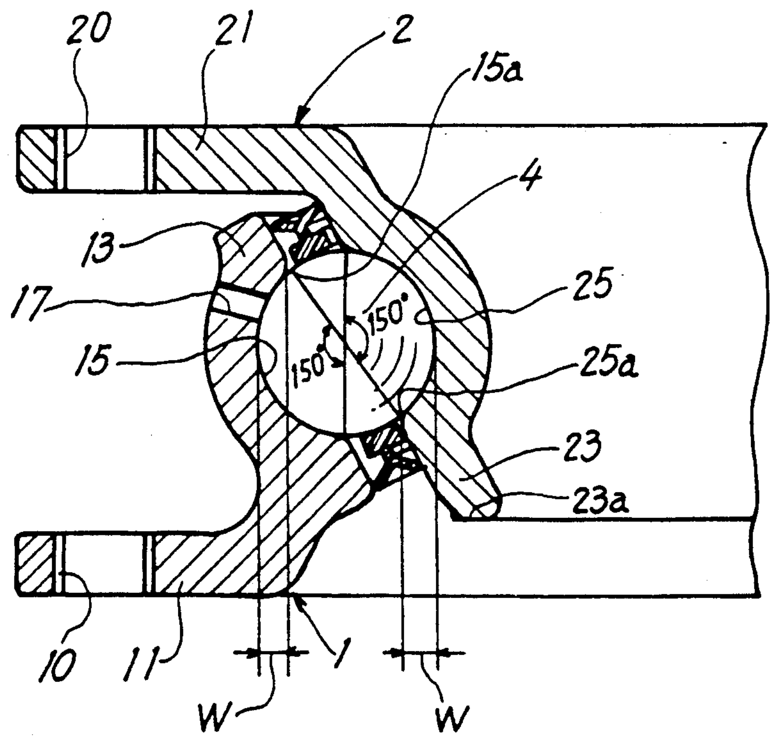
FIG. 2 is a fragmentary view in a section showing the embodiment.
Figure 3:
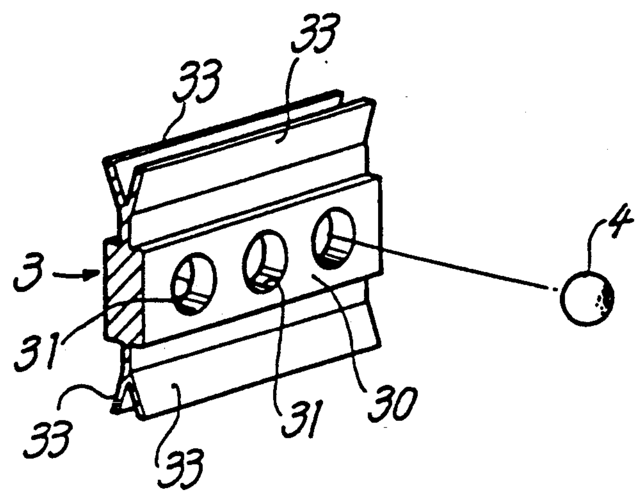
FIG. 3 is a perspective view of a retainer.
Figure 4:
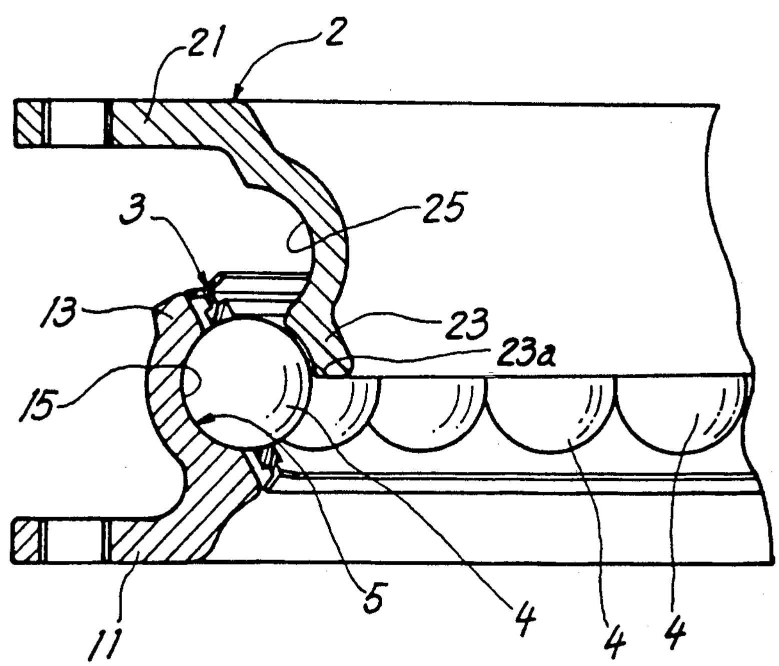
FIG. 4 is a view for illustrating an assembling procedure.

With reference to FIGS. 2 to 4, each of an under ring 1 and an upper ring 2 is prepared from a shape steel member corresponding to the ring in cross section, by bending the member into a ring, about 2 m in diameter, using a bender, and welding opposite ends together.

The under ring 1 comprises a horizontal portion 11 and a peripheral wall 13 projecting upward by a short distance from the inner periphery of the horizontal portion 11 and inclined outward with respect to the vertical direction.

The upper ring 2 comprises a horizontal portion 21 and a peripheral wall 23 projecting downward by a short distance from the inner periphery of the horizontal portion 21 and inclined inward with respect to the vertical direction.

The wall 13 of the under ring 1 has a diameter increasing toward its upper end, while the wall 23 of the upper ring 2 has a diameter decreasing toward its lower end in corresponding relation to the under ring wall 13. The upper ring wall 23 is fitted in the under ring wall 13 with a clearance formed therebetween.

The ring walls 13, 23 are inclined at an angle of about 30 degrees with respect to the vertical direction, i.e., to the axis of rotation of the device.

Preferably, the peripheral wall 23 of the upper ring 2 has a vertical portion 23*a*, about 2 to 3 mm in length, at its lower end for preventing balls from falling off when the upper ring is pressed in as will be described later.

The horizontal portions 11, 21 of the rings 1, 2 are formed respectively with holes 10 for inserting bolts or the like therethrough to fix the device to the floor, and with holes 20 for inserting bolts or the like therethrough to fix a pallet or like work table to the top of the device.

Circumferential guide grooves 15, 25 are formed in the opposed faces of the peripheral walls 13, 23, respectively, approximately centrally of their width. In cross section, the wall surfaces defining the guide grooves 15, 25 are in the form of a circular arc subtending an angle of 150 degrees at the center of the ball 4 to be described below in conformity with the surface of the ball 4.

A grease injection bore 17 is formed in the peripheral wall 13 of the under ring 1 and provided with a grease nipple (not shown).

Balls 4, $\frac{3}{4}$ inch in diameter, are fitted in the guide grooves 15, 25 and arranged between the two rings at a pitch of about 30 mm.

The balls 4 are spaced at the specified distance by synthetic resin retainers 3 shown in FIG. 3.

The retainer 3 comprises a strip 30 having five ball accommodating holes 31 arranged at equal spacings. The strip 30 has bifurcated lips 33, 33 formed at each side thereof and extending longitudinally thereof. The lips 33 are in contact with the respective ring walls 13, 23 to prevent ingress of dust or extraneous matter into the path of rolling of the balls 4.

A required number of retainers 3 are used as arranged along the guide grooves in accordance with the size of the rings.

The opposed surfaces of the rings 1, 2 defining the guide grooves 15, 26 partially cover the balls 4 from above and below, respectively, by an amount W which is about 4 mm. Accordingly, when the upper ring 2 is brought up, the balls 4 engage the outer side edges 15*a*, 25*a* of the respective grooved portions, thereby preventing the rings from separating from each other.

The peripheral walls 13, 23 of the rings 1, 2 rollably supporting the balls 4 are inclined and therefore. permit the balls 4 to withstand both radial load and thrust load at the same time. This gives improved durability to the device although it is simple in construction.

Moreover, since the balls 4 are rollable as fitted in the guide grooves 15, 25 of the upper ring 2 and the under ring 1, these two rings are free of misalignment, rendering the devices usable for precision work.

Figure 7:
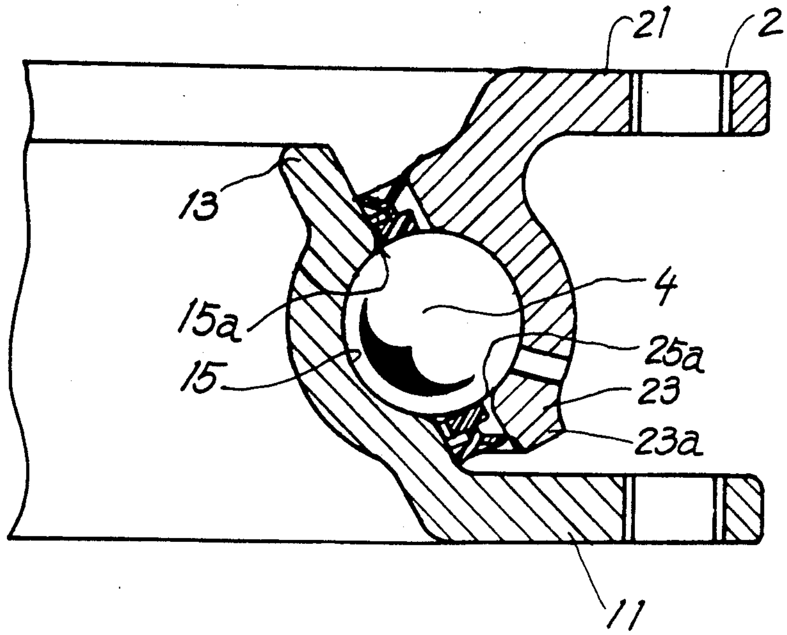
FIG. 7 is a fragmentary view in section showing another rotary support device embodying the invention.

The embodiment shown in FIG. 2 can be of a construction corresponding to the device, as turned upside down. FIG. 7 shows such as embodiment. With reference to FIG. 7, the peripheral wall 13 of an under ring 1 projects upward from the inner periphery of its horizontal portion 11 and is inclined inward with respect to the vertical direction, while the peripheral wall 23 of an upper ring 2 projects downward from the inner periphery of its horizontal portion 21 and is inclined outward with respect to the vertical direction.

Although the guide grooves 15 and 25 are formed in the inner surface of the wall 13 and the outer surface of the wall 23 according to the embodiment shown in FIG. 2, these grooves 15, 25 can conversely be formed in the outer surface of the wall 13 and the inner surface of the wall 23. The same is true of the embodiment of FIG. 7.

The above rotary support will be assembled by the following method and procedure.

With reference of FIG. 4, retainers 3 having balls 4 fitted therein are closely arranged along the guide groove 15 of the under ring 1, and the balls 4 are retained by holding means 5 so as not slip off the grooved portion 15.

With the present embodiment, the holding means 5 is grease. Utilizing the adhering property of the grease, the balls 4 are held in the guide groove 15 against slipping off. Alternatively, the holding means can be suitable mechanical support means for preventing the balls from falling off the guide groove portion.

The lower outer portion of the wall 23 of the upper ring 2 is then placed over the balls 4 (FIG. 4).

When the upper ring 2 is pressed, the ring peripheral walls 13, 23 are deformed away from each other, permitting the balls 4 to fit also into the guide groove 25 of the upper ring 2 (FIG. 2). The vertical portion 23*a* formed on the upper ring wall 23 serves to prevent the balls 4 from falling off the grooved portion 15 at their time as best seen in FIG. 4.

Upon the balls 4 fitting into both the guide grooves 15, 25, the walls 13, 23 restore themselves to the original state. In this state, the outer side edges 15*a*, 25*a* of the grooved portions 15, 25 partially cover the balls 4 so as to retain the balls from falling off. The balls 4 thus engaged by the side edges 15*a*, 25*a* prevent the separation of the two rings.

Although the device can be completed by the foregoing steps, it is desirable to further execute the following step.

Figure 5:
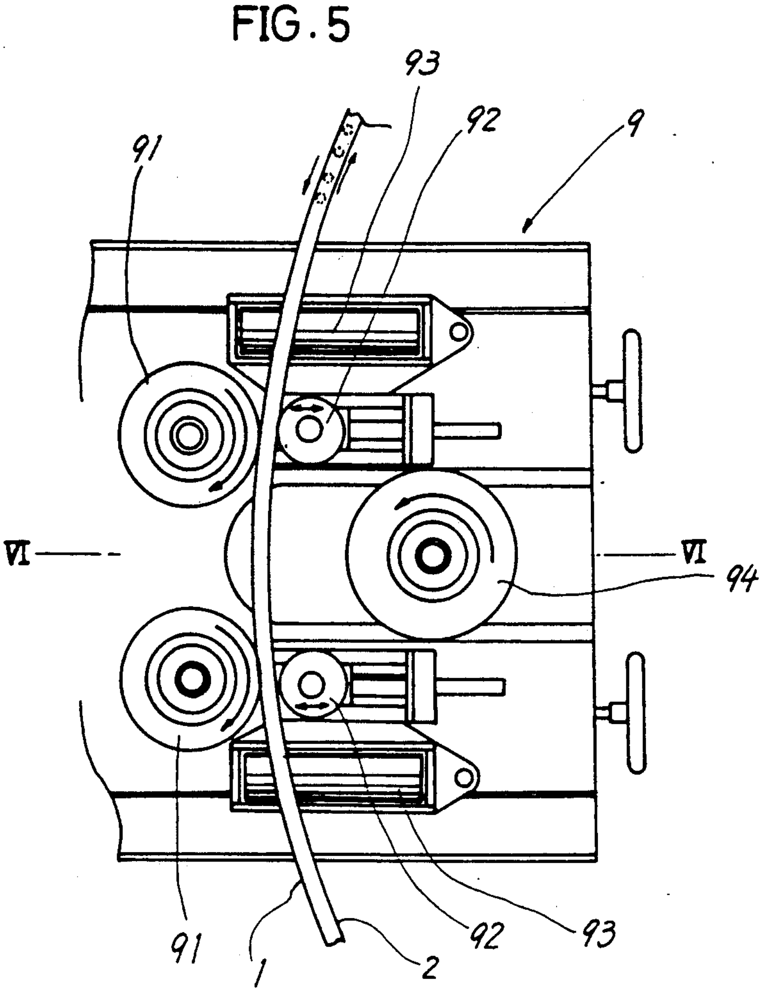
FIG. 5 is a plan view showing the device being corrected.
Figure 6:
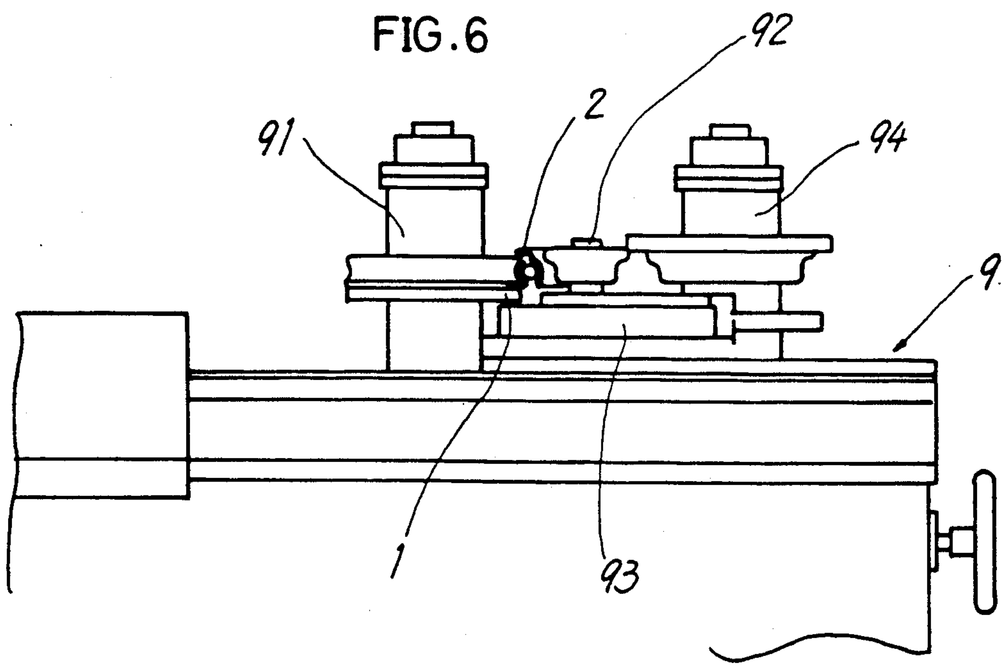
FIG. 6 is a view in section taken along the line VI—VI in FIG. 5.

With reference to FIG. 5, a portion of the rotary support device is fitted in between two fixedly positioned rollers 91, 91 on a known bender 9 and correction rollers 92, 92 opposed to and movable toward or away from the respective rollers 91, 91 with the device placed on support rolls 93, 93 on opposite sides of the rollers 91, 91.

The portion of the device left unsupported by the bender 9 is supported by a plurality of stands (not shown) so that the device is rotatable in a horizontal plane.

A movable pressure roller 94 is moved toward a position between the fixed rollers 91, 91 to push the upper ring 2 with the roller 94, bringing the under ring 1 into contact with the fixed rollers 91, 91.

The two fixed rollers 91, 91 are driven in the same direction, while the pressure roller 94 is driven in a direction opposite to the direction of rotation of the rollers 91.

The rotation of these rollers rotates the upper ring 2 and the under 1 in directions opposite to each other. The correction rollers 92 are moved toward the fixed rollers 91 to press the wall 23 of the upper ring 2 outward.

Consequently, the upper ring wall 23 rotates while being subjected to a force acting to diametrically enlarge the wall 23. This eliminates a clearance, if any, between the balls 4 and the grooved portions 25, 15 of the upper and under rings 2, 1. The above operation also breaks in the balls 4 and the grooved rings 1, 2, rendering the balls 4 smoothly rotatable along the guide grooves 15, 25 even if these grooves are not finished by cutting to make the upper ring 2 smoothly rotatable.

The breaking-in step may alternatively be so performed as to rotate the two rings relative to each other while pressing the peripheral wall of the outer ring inward.

In fabricating small rotary support devices, the under ring and the upper ring can be prepared by blanking with a press and bending the blanks.

Furthermore, the guide grooves 15, 25 may be formed in the under ring and upper ring by recessing the peripheral walls 13, 23 to the shape of a groove by press work, and cutting the grooved portions in conformity with the spherical surface of the ball 4 when required.

As already stated, balls 4 are arranged in the guide groove of one of the rings, and the two rings are arranged as opposed to each other, with the balls 4 interposed therebetween and prevented from slipping off the grooved portion. In this state, the two rings are pressed against each other.

The deforms the under ring wall 13 and the upper ring wall 23 away from each other, permitting the balls to fit also in to the guide groove 25 of the other ring.

Upon the balls 4 fitting into both the guide grooves 15, 25, the peripheral walls 13, 23 restore themselves to the original state, with the result that the two rings 1, 2 are engaged with each other by the balls 4, which prevent separation of the two rings.

The ring walls 13, 2 rollably supporting the balls 4 are in the form of a cone or inverted cone, and the balls 4 withstand both radial load and thrust load at the same time. This construction makes the device simple in construction.

Since the balls 4 are rollable as fitted in the guide grooves 15, 25 of the under and upper rings 1, 2, the two rings can be held in alignment with each other. Accordingly, the support device is usable for precision work.

As stated above, the device can be assembled merely by pressing the upper ring 2 against the under ring 1 with the balls 4 arranged on the ring 1. The device can therefore be produced by a simplified process at a reduced cost.

Figure 8:
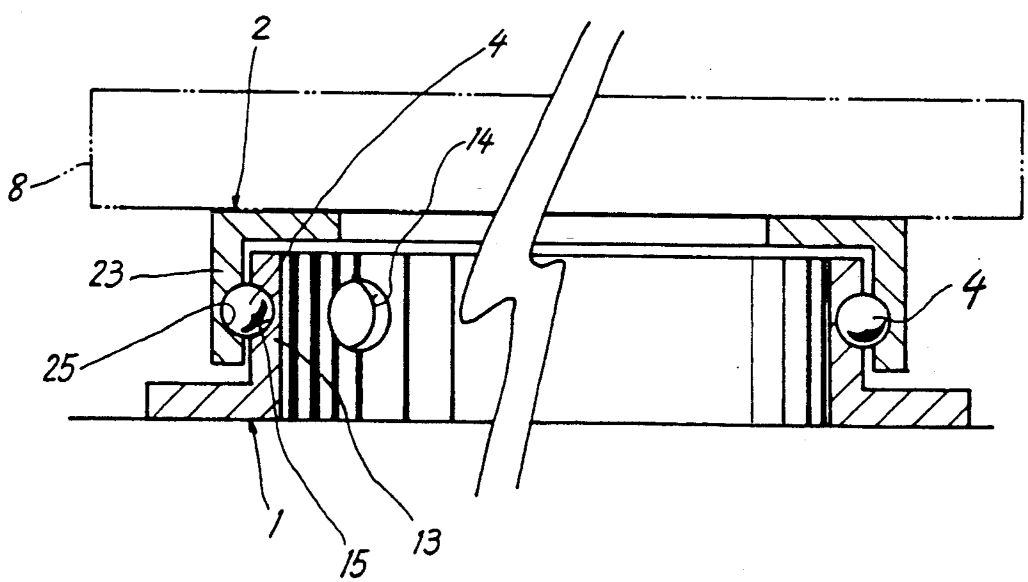
FIG. 8 is a fragmentary sectional view of a conventional device.

This can not be realized by the conventional rotary support device of FIG. 8 which comprises the combination of upper and under rings having a substantially vertical wall, and balls.

The present invention is not limited to the foregoing embodiments but can be modified variously within the scope defined in the appended claims.

What is claimed is:

1. A rotary support device for rotatably supporting an article carrying member such as a pallet thereon, said rotary support device comprising:

an under ring including a horizontal base portion and a peripheral wall portion, said peripheral wall portion projecting upward from an inner periphery of the horizontal base portion with an outward or inward inclination and having a guide groove formed in a peripheral surface thereof, forming a grooved wall;

an upper ring including a horizontal bearing portion for supporting the article carrying member and a peripheral wall portion, said peripheral wall portion projecting downward from an inner periphery of the horizontal bearing portion with an inward or outward inclination corresponding to the inclination of the under ring and having a guide groove formed in a peripheral surface thereof, forming a grooved wall;

a multiplicity of balls rollably interposed between the guide grooves of the under and upper rings;

retainer means provided for holding a substantially constant spacing between adjacent balls, said peripheral wall portions of the under and the upper ring being deformable away from each other thereby permitting the balls to be fitted into the guide grooves, and each of the under and the upper rings having a side edge on a side of the respective groove wall which is furthest from the horizontal portion of the respective ring, said side edge of the under ring covering the multiplicity of balls from the top, said side edge of the upper ring covering the balls from below, wherein said upper and under rings are in engagement with each other inseparably and rotatably, with the balls provided therebetween.

2. A rotary support device as defined in claim 1 wherein said retainer means further includes seal means in engagement with the peripheral wall portions of the under and upper rings and for preventing ingress of dust or extraneous matter into a rolling path of the balls.

3. A rotary support device as defined in claim 1 wherein said upper ring is formed at a free end of the peripheral wall with a skirt portion extending vertically therefrom.

4. A rotary support device as defined in claim 2 wherein said upper ring is formed at a free end of the peripheral wall with a skirt portion extending substantially vertically therefrom.

* * * * *